(12) United States Patent
Ito et al.

(10) Patent No.: US 6,828,509 B2
(45) Date of Patent: Dec. 7, 2004

(54) BINDING BAND FOR A WIRE HARNESS DIVERGING PORTION

(75) Inventors: Toshihiro Ito, Kosai (JP); Takashi Matsuura, Tokyo (JP); Nobuyuki Kaneko, Hyogo (JP)

(73) Assignees: Yazaki Corporation, Tokyo (JP); Tyton Company of Japan, Ltd., Tokyo (JP)

( * ) Notice: Subject to any disclaimer, the term of this patent is extended or adjusted under 35 U.S.C. 154(b) by 0 days.

(21) Appl. No.: 10/442,095

(22) Filed: May 21, 2003

(65) Prior Publication Data

US 2003/0226686 A1 Dec. 11, 2003

(30) Foreign Application Priority Data

Jun. 10, 2002 (JP) ......................................... 2002-168621

(51) Int. Cl.[7] .......................... A44B 21/00; B65D 63/00; F16L 33/00
(52) U.S. Cl. ..................... 174/135; 174/72 A; 24/16 PB
(58) Field of Search .............................. 174/72 A, 135; 24/16 PB

(56) References Cited

U.S. PATENT DOCUMENTS

| | | | |
|---|---|---|---|
| 4,312,487 A | * | 1/1982 | Kimura .................... 24/16 PB |
| 5,042,113 A | * | 8/1991 | Severson et al. .......... 24/16 PB |
| 6,196,033 B1 | * | 3/2001 | Dowdle ..................... 24/16 PB |
| 6,543,094 B2 | * | 4/2003 | D'Addario ................. 24/16 PB |

FOREIGN PATENT DOCUMENTS

| | | | | |
|---|---|---|---|---|
| JP | 63-97279 | | 6/1988 | |
| JP | 6-65682 | | 9/1994 | |
| JP | 10144156 A | * | 5/1998 | ........... H01B/13/00 |
| JP | 200134771 A | * | 5/2000 | ............ H02G/3/30 |
| JP | 2000350337 A | * | 12/2000 | ............ H02G/3/30 |
| JP | 20001231126 A | * | 8/2001 | ............ H02G/3/04 |

* cited by examiner

Primary Examiner—Dean A. Reichard
Assistant Examiner—Adolfo Nino
(74) Attorney, Agent, or Firm—Bacon & Thomas, PLLC

(57) ABSTRACT

The present invention relates to a binding band (1) for a wire harness diverging portion, which is used for binding a diverging portion having a trunk portion (TL) formed by gathering plural wire harnesses (WH) and a branch portion (BL) branching from the trunk portion. An object of the present invention is to improve an operation efficiency wherein a band body (2) is passed through a piercing-engagement hole (7) of a lock portion (4), and a binding operation efficiency for binding a wire harness diverging portion (WD).

14 Claims, 6 Drawing Sheets

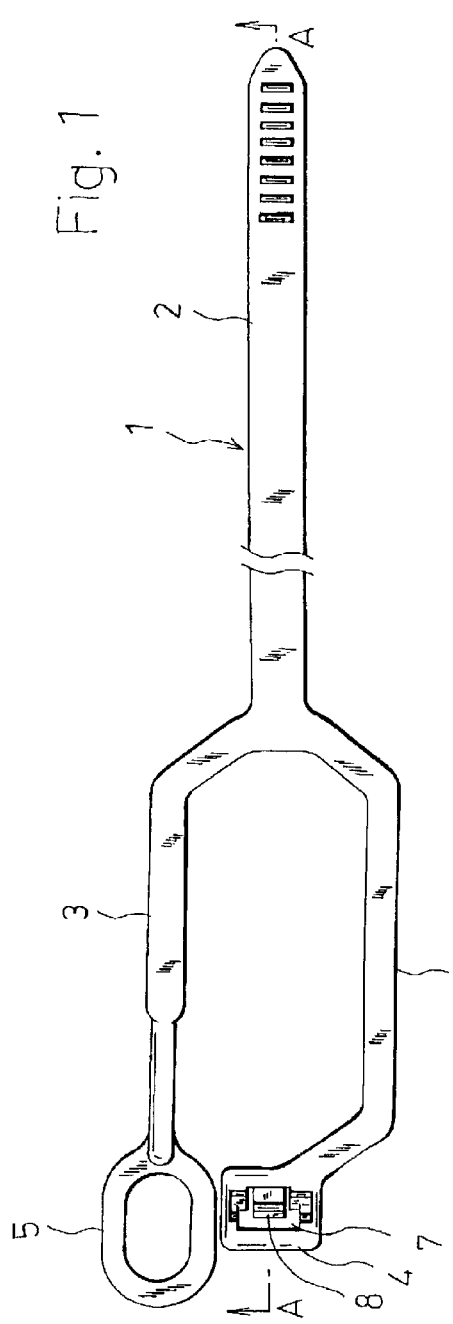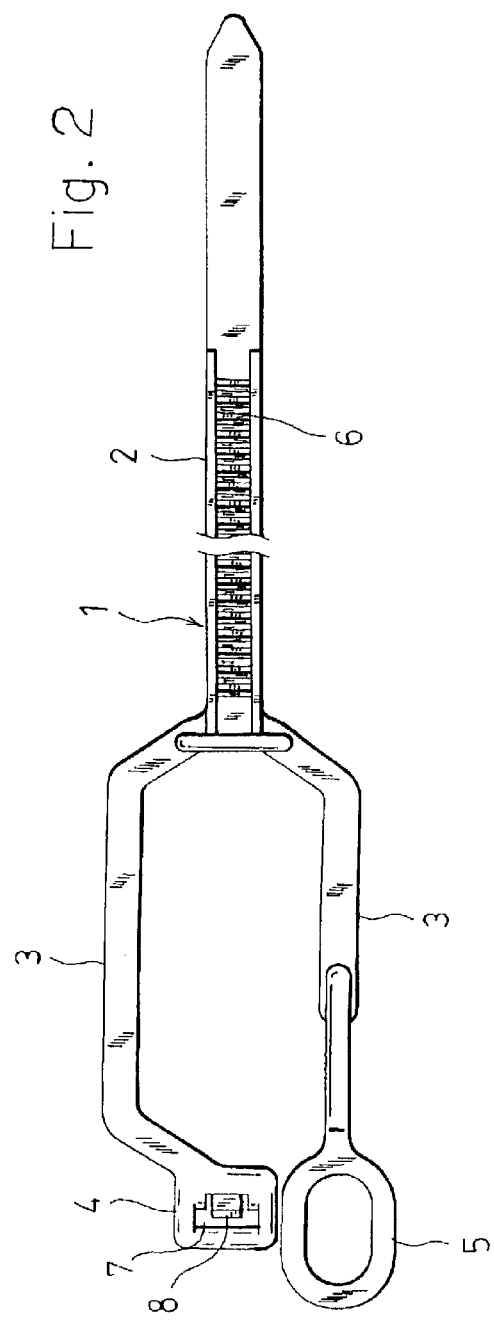

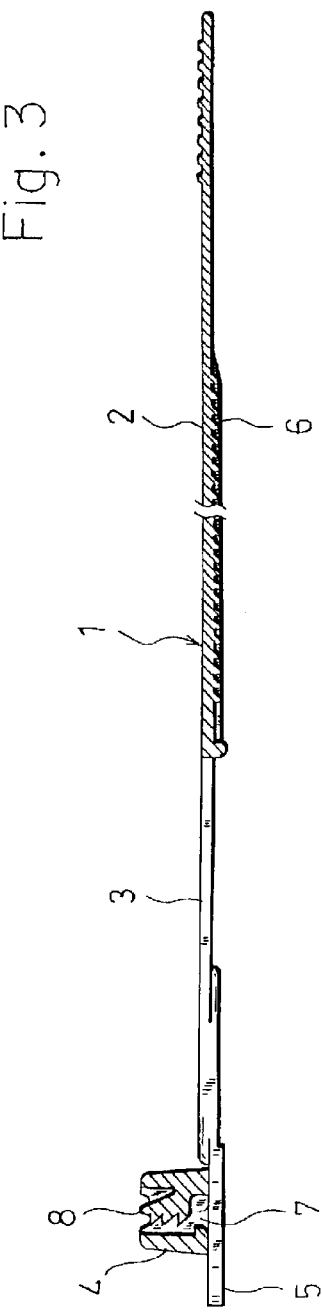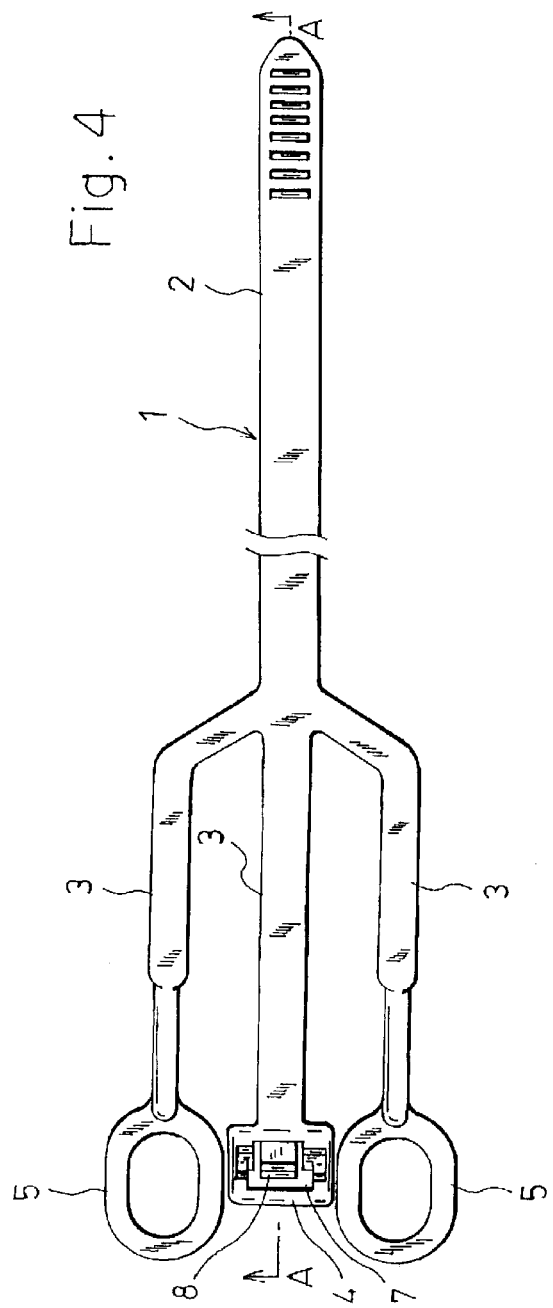

BINDING BAND FOR A WIRE HARNESS DIVERGING PORTION

BACKGROUND OF THE INVENTION

1. Field of the Invention

The present invention relates to a binding band for a wire harness diverging portion (hereinafter called "the binding band") including a trunk portion formed by gathering wire harnesses and a branch portion diverging from the trunk portion, which is used for keeping the wire harness diverging portion in a binding state. More particularly, it relates to the binding band, which has a band body, branch portions branching from the band body, and a lock portion for latching the band body to the branch portions through engagement so as to prevent the band body from slipping.

2. Description of the Prior Art

Such kind of a binding band for a wire harness diverging portion is well known in Japanese Utility Model Application Laying-open Nos. 63-97279 and 6-65682. In the binding band, a band body branches off from the vicinity of a lock portion having a piercing-engagement hole, in a two-forked state, thereby resulting in the extended two-rows band bodies, and the band body passes through the piercing-engagement hole of the lock portion, so that the band body is stopped in an engaged state, so as to prevent it from slipping off. When the wire harness diverging portion is kept in a binding state by means of the binding band, a branch portion of the wire harness diverging portion is inserted into a portion between the two-rows band bodies, the two-rows band bodies are wound around the trunk portion of the wire harness diverging portion, and the respective tips of the two-rows band bodies are overlapped with each other in the piercing-engagement hole of the lock portion (shown in Japanese Utility Model Application Laying-open No. 63-97279) or they are arranged in two rows in the piercing-engagement hole of the lock portion (shown in Japanese Utility Model Application Laying-open No. 6-65682), whereby they are penetrated therein, so as to stop the band body by connecting the branch portion so as to prevent the band body from slipping off.

In the well-known binding band for a wire harness diverging portion, the two-rows band bodies must pierce respectively the piercing-engagement hole of the lock portion, and a piercing operation is extremely troublesome. This has caused decrease of an operation efficiency for binding a wire harness diverging portion.

SUMMARY OF THE INVENTION

The present invention has been conducted in view of the above-discussed circumstances and problems.

An object of the present invention is to improve a band piercing operation for making the band body pierce a piercing-engagement hole of the lock portion.

Another object of the present invention is to improve a binding operation efficiency in binding the wire harness diverging portion by means of the binding band.

The binding band according to the present invention, in which the wire harness diverging portion includes a trunk portion formed by gathering plural wire harnesses and a branch portion branching from the trunk portion, comprises:

a bendable band body, plural bendable branch portions successively formed so as to be integrated with a base end portion of the band body, a lock portion disposed integrally with a tip of one branch portion among the plural branch portions, the lock portion having the piercing-engagement hole which makes the band body pierce in only one direction and prevents it from slipping off in an opposite direction, and an endless ring portion disposed integrally with a tip of the other branch portion, which the band body pierces earlier than it pierces the piercing-engagement hole of the lock portion.

In the present invention, it is preferable that the lock portion and the ring portion are separated from each other. In this case, it is preferable that the ring portion can be overlapped with the lock portion in a stack condition. Moreover, it is preferable that the band body and the branch portion having the ring portion have bendability so as to be make it possible to wind around the trunk portion at the wire harness diverging portion.

The present invention can adopt a structure wherein the wire harness diverging portion is provided with the two-forked branch portions, which hold the branch portion, one of the branch portions is provided with the lock portion, and the other is provided with the ring portion.

The present invention may adopt a structure wherein the number of the branch portions is (N+1) when the number of the branch portions is N.

In the present invention, the band body may be provided with a stopper for each of the other members such as a vehicle body, devices or the like.

In the binding band having the above structures, the branch portion of the wire harness diverging portion is held between the branch portions. Then, the ring portions are overlapped with the lock portion by means of bending-deformation or the like of each branch portion. After the band body is wound around the outer periphery of the trunk portion of the wire harness diverging portion, the tip portion of the band body passes through the ring portion and the piercing-engagement hole of the lock portion in order, thereby stopping the tip of the band body inside the piercing-engagement hole through engagement so as to prevent it from slipping. As a result, the wire harness diverging portion can be kept in a binding state wherein it is surely and stably fastened.

According to the binding band having the above structures, a branch portion having the lock portion and another branch portion having the ring portion are successively and integrally disposed on a basal end of the band body. The branch portion of the wire harness diverging portion is held between the branch portions, and one band body is wound around the trunk portion of the wire harness diverging portion. The tip portion of the band body is passed through the ring portion and the piercing-engagement hole of the lock portion, which is overlapped with each other, in order.

So, compared with a conventional operation wherein two-rows band bodies are respectively passed through the lock portion so as to stop them through engagement, the present invention can easily expedite an operation for binding the wire harness diverging portion.

As mentioned above, according to the binding band shown in the present invention, the binding operation can be done only if one band body is passed through the piercing-engagement hole of one lock portion. Thus, conveniently, the present invention can easily expedite the operation for binding the wire harness diverging portion.

BRIEF DESCRIPTION OF THE DRAWINGS

FIG. 1 is a plan view of the binding band according to one embodiment of the present invention.

FIG. 2 is a bottom view of the binding band shown in FIG. 1.

FIG. 3 is a section view taken along a line of A—A of FIG. 1.

FIG. 4 is a plan view of the binding band according to another embodiment.

DETAILED DESCRIPTION OF THE PREFERRED EMBODIMENT

A preferable embodiment of the invention will be described with reference to drawings.

Figure 5:
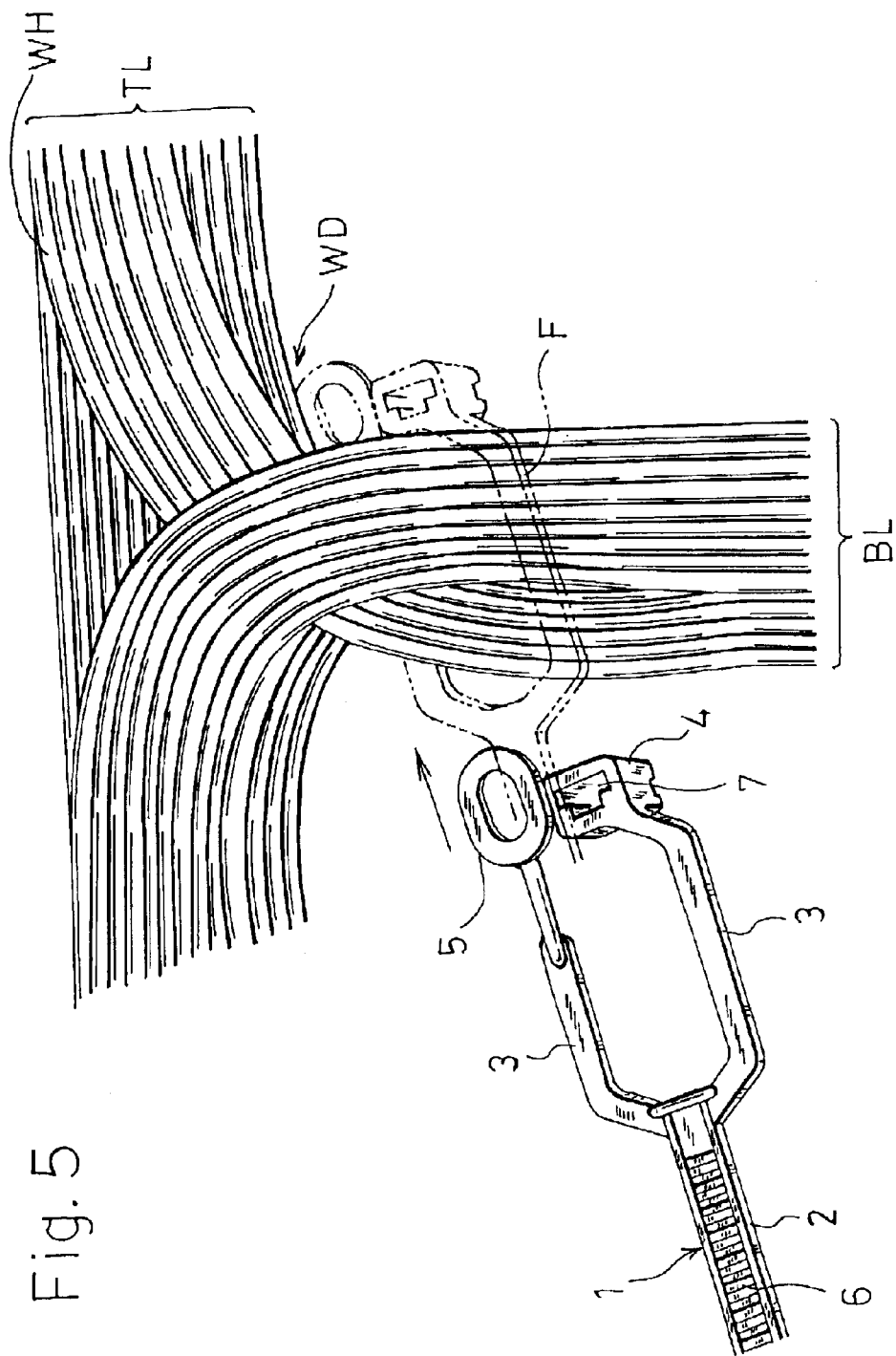
FIG. 5 is a perspective view showing a state prior to fitting the binding band of FIG. 1 to the wire harness diverging portion.

A wire harness diverging portion-binding band 1 (hereinafter called "the binding band") according to the present invention is used for a wire harness diverging portion WD having a T-shape or the like, including a trunk portion TL formed by gathering plural wire harnesses WH and a branch portion BL branching from the trunk portion TL, as shown in FIG. 5.

As shown in FIGS. 1 to 3, the binding band 1 is an integral article made of synthetic resin such as nylon, as a whole. In the binding band 1, plural bendable branch portions 3 are successively formed so as to integrated with a base end portion of a plate-shaped bendable band body 2. A lock portion 4 is disposed integrally with a tip of one of the plural branch portions 3, and a ring portion 5 is disposed integrally with tips of the other branch portions 3. Though the number of branch portions 3 is two in FIGS. 1 to 3, the number thereof may be three as shown in FIG. 4, or more.

As shown in FIGS. 2 and 3, engagement teeth 6 are longitudinally and successively arranged at a predetermined distance on a face of the band body 2. The lock portion 4 is formed to be rectangular box-shaped. The lock portion 4 includes a piercing-engagement hole 7 (hereinafter called "the hole") Inside the hole 7, an engagement claw 8 engaged with the engagement teeth 6 in the band body 2 is disposed. The hole 7 can make the band body 2 pierce in only one direction. The band body 2 is stopped so as to prevent it from slipping in an opposite direction by means of engaging the engagement teeth 6 with the engagement claw 8. The ring portion 5 is endlessly formed so as to have an inner diameter through which the band body 2 can pass. The ring portion 5 is separated from the lock portion 4 so that the ring portion 5 can be overlapped with the lock potion 4 by bending the branch portions 3 or the like.

Figure 6:
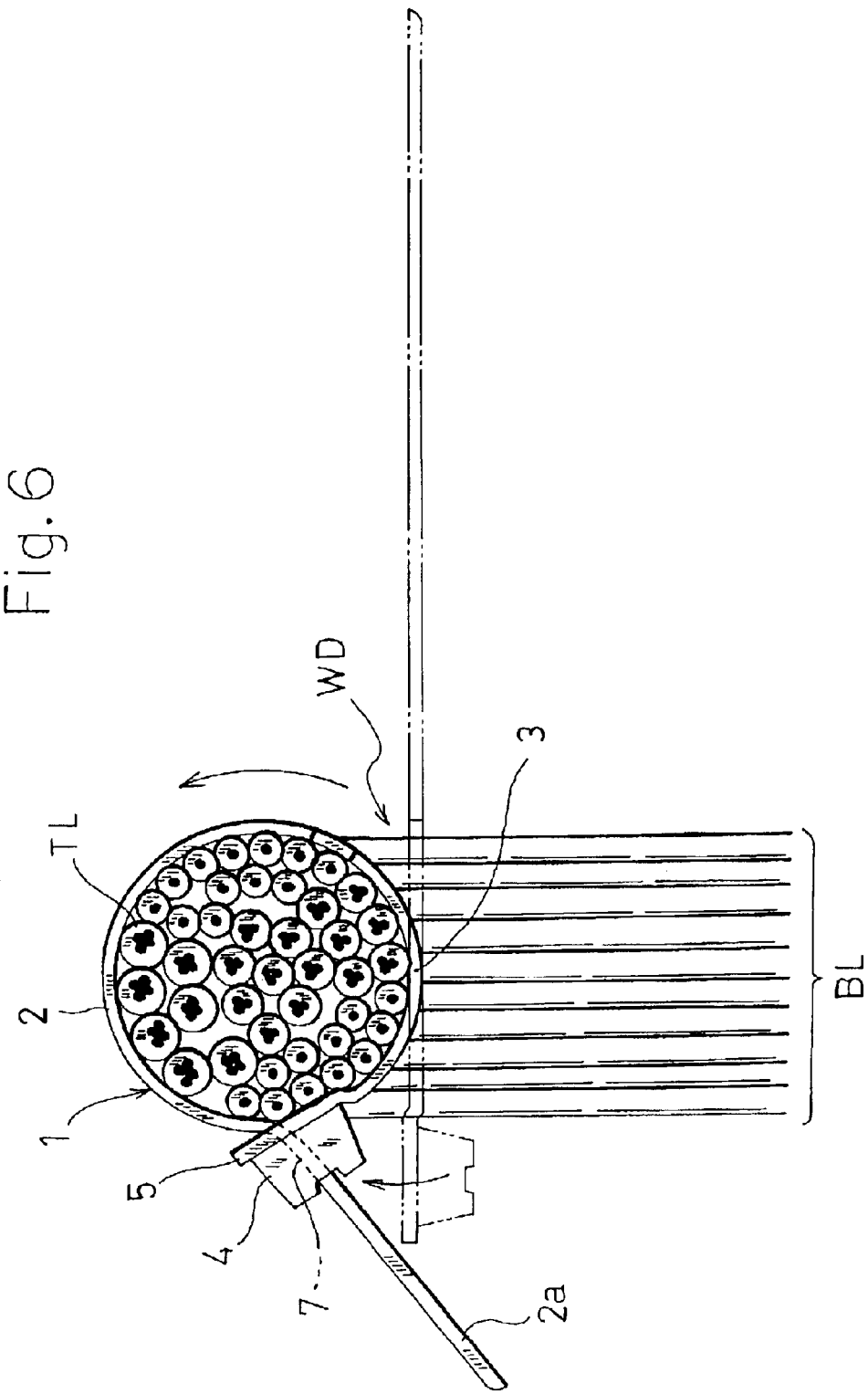
FIG. 6 is a side view showing a state of binding the wire harness diverging portion by means of the binding band of FIG. 1.
Figure 7:
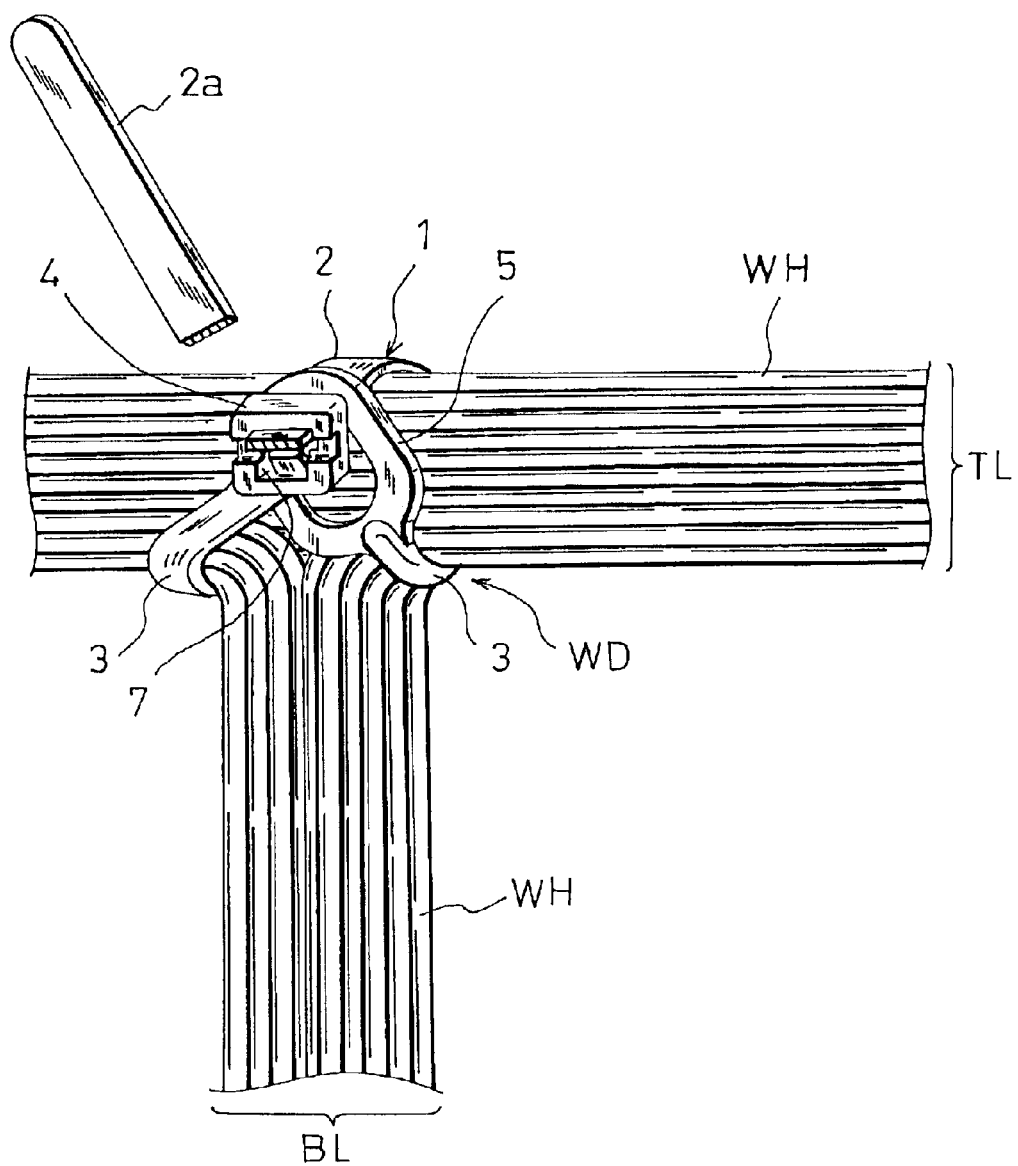
FIG. 7 is a perspective view showing a state of binding the wire harness diverging portion by means of the binding band of FIG. 1.

Next, procedures are shown for binding and holding the wire harness diverging portion WD by means of the binding band 1 having the above structures First, as shown in a two-dot chain line F in FIG. 5, the branch portion BL of the wire harness diverging portion WD is inserted and hold between said two branch portions 3,3 of the binding band 1. Next, as shown in FIGS. 6 and 7, the band body 2 is wound around an outer periphery of the trunk portion TL at the same time when a tip portion of the band body 2 pierces the ring portion 5 and the hole 7 of the lock portion 4 in order, thereby engaging the engagement teeth 6 of the band body 2 with the engagement claw 8 inside the hole 7 so as to prevent it from slipping off. In this case, the structure is also accepted that the ring portion 5 is overlapped with the lock portion 4 by means of bending the each branch portion 3; and after the band body 2 is wound around the outer periphery of the trunk portion TL, the tip portion of the band body 2 is passed though the ring portion 5 and the hole 7 of the lock portion 4 in order, thereby engaging the engagement teeth 6 of the band body 2 with the engagement claw 8 inside the hole 7 so as to prevent it from slipping off. As a result, the wire harness diverging portion WD can be kept in a binding state wherein it is surely and stably fastened. A surplus portion 2a on a side of the tip of the band body 2, which protrudes from the lock portion 4, can be cut according to the necessity after binding them, as shown in FIG. 7.

In case that there are two branch portions BL in the wire harness diverging portion WD, the number of the branch portions 3 may be set to three. In other words, when the number of the branch portions BL is N, the number of the branch portions is (N+1). Moreover, a position of the lock portion 4 is not particularly limited.

As mentioned above, in the binding band 1 according to the embodiment, the operation can be conducted if the band body 2 is passed through the hole 7 of the lock portion 4 and the ring portion 5 only once. So, compared with a conventional operation wherein two-rows band bodies respectively pierce the lock portion 4, the present invention can easily shorten time required for operation for binding the wire harness diverging portion WD.

Figure 8:
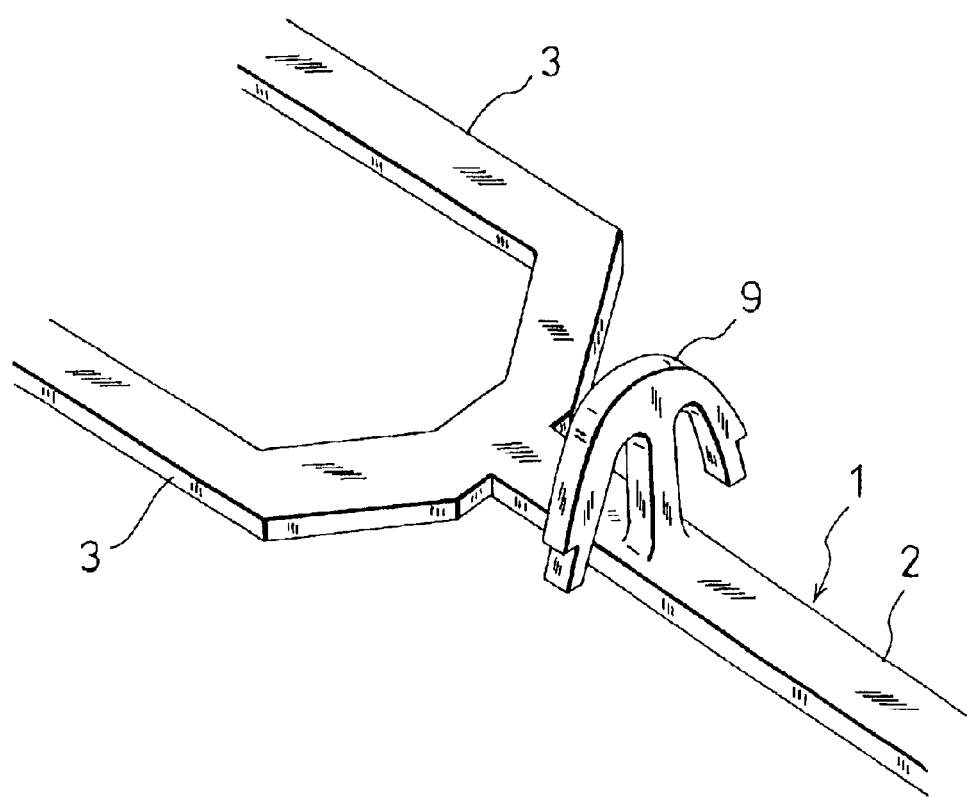
FIG. 8 is a partial perspective view of the binding band according to still another embodiment.

As shown in FIG. 8, the band body 2 is integrally provided with an arrow-shaped stopper 9. The stopper 9 can be fitted in a hole or a groove of other member such as a vehicle body, devices or the like.

The entire disclosure of Japanese Patent Application No. 2002-168621 filed on Jun. 10, 2002 including specification, claims, drawings and summary are incorporated herein by reference in its entirety.

What is claimed is:

1. A binding band for a wire harness diverging portion, in which the wire harness diverging portion includes a trunk portion formed by a gathering plural wire harnesses and a branch portion branching from the trunk portion, comprising:

a bendable band body;

plural bendable branch portions successively formed so as to be integrated with a base end portion of said bendable band body;

a lock portion disposed integrally with a tip of one branch portion of said plural bendable branch portions, said lock portion having a piercing-engagement hole which makes said bendable band body pierce in only one direction and prevents it from slipping off in an opposite direction; and an endless ring portion disposed integrally with the corresponding tip of the other of said plural bendable branch portions, which said bendable band body pierces earlier than it pierces the piercing-engagement hole of said lock portion.

2. A binding band for a wire harness diverging portion according to claim 1, wherein said lock portion and said endless ring portion are separated from each other.

3. A binding band for a wire harness diverging portion according to claim 2, wherein said lock portion can be overlapped with said endless ring portion in a piling state.

4. A binding band for a wire harness diverging portion according to claim 2, wherein said bendable band body and said bendable branch portion having said endless ring portion are bendable so as to be make it possible to wind around the trunk portion at the wire harness diverging portion.

5. A binding band for a wire harness diverging portion according to claim 1, wherein the wire harness diverging portion is provided with two-forked branch portions, which hold said bendable branch portion, with one of said bendable branch portions being provided with said lock portion, and the other of said bendable branch portions being provided with said ring portion.

6. A binding band for a diverging portion in a wire harness according to claim 1, wherein the number of said bendable branch portions is (N+1) when the number of said bendable branch portions without a lock portion is N.

7. A binding band for a diverging portion in a wire harness according to claim 1, wherein said bendable band body is provided with a stopper which can be fitted into an opening of another member.

8. A binding band for a wire harness diverging portion, in which the wire harness diverging portion includes a trunk portion formed by a gathering plural wire harnesses and a branch portion branching from the trunk portion, comprising:

a bendable band body;

plural bendable branch portions successively formed so as to be integrated with a base end portion of said bendable band body;

a lock portion disposed integrally with a tip of one branch portion of said plural bendable branch portions, said lock portion having a piercing-engagement hole which makes said bendable band body pierce in only one direction and prevents it from slipping off in an opposite direction; and at least one endless ring portion disposed integrally with a the corresponding tip of the other of said plural bendable branch portions, which said bendable band body pierces earlier than it pierces the piercing-engagement hole of said lock portion.

9. A binding band for a wire harness diverging portion according to claim 8, wherein said lock portion and said endless ring portion are separated from each other.

10. A binding band for a wire harness diverging portion according to claim 9, wherein said lock portion and said endless ring portion are in a piling state.

11. A binding band for a wire harness diverging portion according to claim 9, wherein said bendable band body and said bendable branch portion having said endless ring portion are bendable so as to be make it possible to wind around the trunk portion at the wire harness diverging portion.

12. A binding band for a wire harness diverging portion according to claim 8, wherein the wire harness diverging portion is provided with two-forked branch portions, which hold said bendable branch portion, with one of said bendable branch portions being provided with said lock portion, and the other of said bendable branch portions being provided with said ring portion.

13. A binding band for a diverging portion in a wire harness according to claim 8, wherein the number of said bendable branch portions is (N+1) when the number of said bendable branch portions without a lock portion is N.

14. A binding band for a diverging portion in a wire harness according to claim 8, wherein said bendable band body is provided with a stopper which can be fitted into an opening of another member.

* * * * *